United States Patent [19]

Watanabe et al.

[11] Patent Number: 4,643,526
[45] Date of Patent: Feb. 17, 1987

[54] LIQUID CRYSTAL DISPLAY DEVICE HAVING A RESIN-COATED IC CHIP

[75] Inventors: Haruo Watanabe; Eiichi Tajima; Masaaki Matsunaga; Toshihide Hirohara; Yoshio Iinuma; Naotake Ando; Shigeyuki Takahashi; Teruaki Takahashi, all of Tokorozawa, Japan

[73] Assignee: Citizen Watch Co., Ltd., Tokyo, Japan

[21] Appl. No.: 731,274

[22] Filed: May 7, 1985

[30] Foreign Application Priority Data

May 12, 1984 [JP] Japan ................... 59-095368

[51] Int. Cl.⁴ .................................................. G02F 1/13
[52] U.S. Cl. .................................. 350/332; 350/339 R
[58] Field of Search ........................... 350/332, 339 R

[56] References Cited

U.S. PATENT DOCUMENTS

| | | | |
|---|---|---|---|
| 4,025,162 | 5/1977 | Yagi | 350/332 X |
| 4,058,970 | 11/1977 | Ichinose | 350/332 X |
| 4,145,120 | 3/1979 | Kubota | 350/332 |
| 4,394,067 | 7/1983 | Spruijt et al. | 350/332 X |
| 4,474,432 | 10/1984 | Takamatsu et al. | 350/339 R |

Primary Examiner—John K. Corbin
Assistant Examiner—Richard F. Gallivan
Attorney, Agent, or Firm—Birch, Stewart, Kolasch & Birch

[57] ABSTRACT

An IC chip is connected to terminal portions of conductive films on a lower substrate of a liquid crystal display panel by face down bonding. The IC chip and conductive films are coated with resin to protect the IC chip and films.

4 Claims, 3 Drawing Figures 4,643,526

LIQUID CRYSTAL DISPLAY DEVICE HAVING A RESIN-COATED IC CHIP

BACKGROUND OF THE INVENTION

The present invention relates to a liquid crystal display device, and more particularly to a structure for connecting a liquid crystal display panel to an integrated circuit (IC) for driving the display panel.

Since the liquid crystal display device can be driven by low voltage and low electric power, it is of advantage to a small portable electronic device such as an electronic wristwatch, a television receiver, and other similar devices. In order to provide a small portable electronic device, it is necessary to connect the IC (including LSI) to the liquid crystal display device by terminal dispositions of high density, and it is desirable to mount the IC on a substrate for electrodes of a liquid crystal display panel.

Conventional methods for connecting a liquid crystal display panel and the IC are as follows:

(1) A packaged IC is mounted on the electrode substrate by soldering;
(2) An IC chip is disposed on a substrate and electrically connected to electrodes by wire bonding;
(3) After an IC chip is electrically adhered to electrodes by conductive adhesives, the IC chip is protected by a cap.

However, these methods have disadvanteges. The first method is undesirable for providing a compact device of high density, because of the packaged IC. By the second method, an IC chip provided with a two-dimensional pad disposition can not be employed because of the limitation by wire bonding method per se. In the third method, the cap method has an inherent problem. The water vapor inevitably stays in a space between the IC chip and the cap, which causes the corrosion of wirings of circuits. In order to prevent the corrosion, the substrate and cap must be sealed by a hermetic seal. However, the temperature applied to the liquid crystal display panel having liquid crystal material must be maintained below 150° C. in order to prevent the deterioration of the material, which means difficulty for the hermetic seal.

SUMMARY OF THE INVENTION

The object of the present invention is to provide a structure for connecting a liquid crystal display panel to an IC chip by face down bonding, whereby a device having high reliability, productivity, and a high density terminal disposition is realized.

According to the present invention, there is provided a liquid crystal display device comprising a liquid crystal display panel having upper and lower substrates, conductive films provided on the underside of the upper substrate and on the lower substrate, the lower substrate having a larger size than the upper substrate to form a connecting portion.

In accordance with the present invention, terminal portions are formed on the connecting portion of the lower substrate and electrically connected to the conductive film on the lower substrate, and an electric circuit element having terminal portions on the underside thereof is connected to the terminal portions on the connecting portion through conductive adhesives. The electric circuit is covered by a nonconducting coating provided on the lower substrate.

These and other objects and features of the present invention will become more apparent from the following description with reference to the accompanying drawings.

DESCRIPTION OF THE PREFERRED EMBODIMENTS

Figure 1:
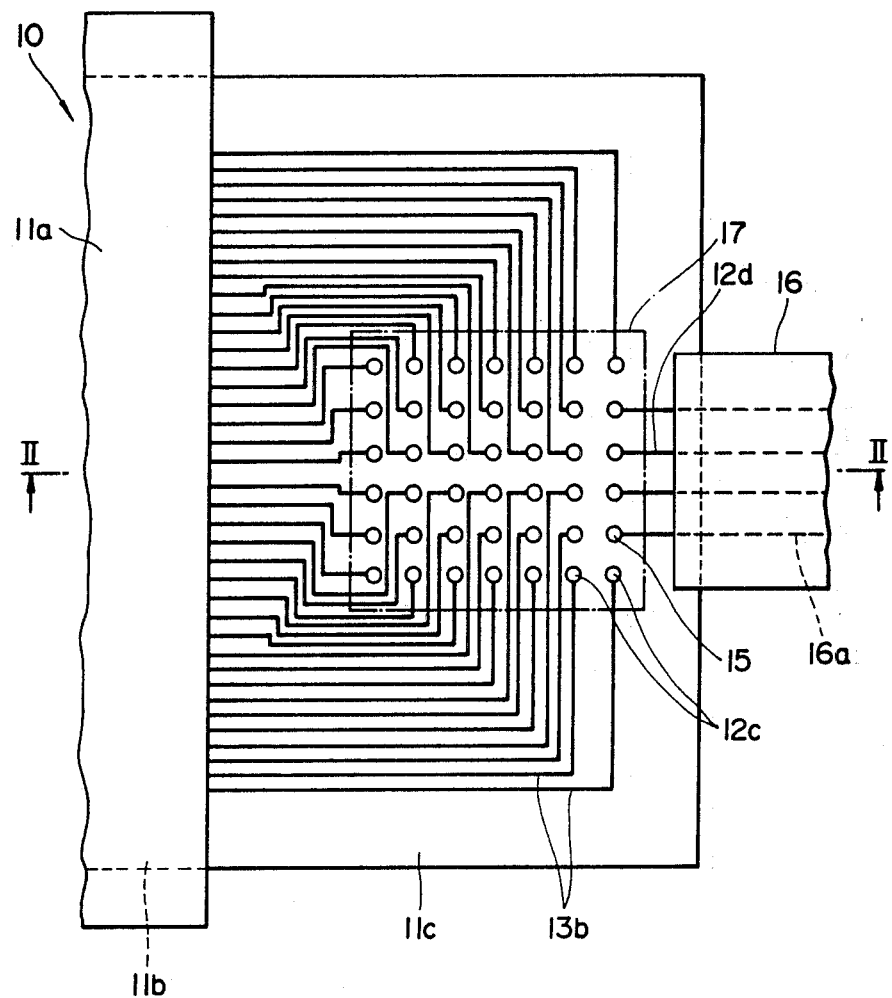
FIG. 1 is a plan view of a part of a liquid crystal display device according to the present invention, in which a resin coating and an IC chip are omitted for the convenience of illustration.
Figure 2:
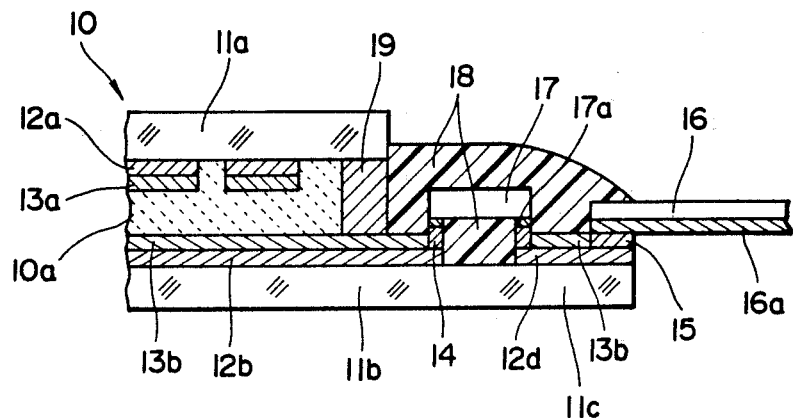
FIG. 2 is a sectional view taken along a line II—II of FIG. 1.

Referring to FIGS. 1 and 2 showing a connecting structure for a liquid crystal display panel 10 and an IC (or LSI) chip 17 by face down bonding, the liquid crystal display panel comprises a transparent upper substrate 11a and a transparent lower substrate 11b. The upper and lower substrates are shaped to form a connecting portion 11c on the lower substrate. Each of substrates 11a and 11b is made of sodium glass, borosilicate glass, lead glass, or an organic glass such as polyethersulfone, polysulfone, polycarbonate or acrylic resin. A plurality of transparent conductive films (electrodes) 12a and 12b made of $SnO_2$ or $In_2O_3$ are secured to inner surfaces of substrates 11a and 11b, respectively. The conductive films 12b extend from the display panel onto the connecting portion 11c. Leads 13a and 13b are disposed on the conductive films 12a and 12b in order to reduce electrical resistivity of the films. The leads 13a and 13b are made of conductive material, such as chromium, nickel, nickel phosphate, copper, gold or carbon, and formed by thick film, thin film or plating. Liquid crystal material 10a is sealed between upper and lower substrates 11a and 11b by sealing members 19 made of epoxy resin.

IC chip 17 is disposed on the conductive film 12b on the substrate 11b and pads 17a on the underside of the IC chip are electrically connected to terminal pads 12c (FIG. 1) of the film 12b through conductive adhesive 14. The conductive adhesive 14 is made of epoxy resin including silver powder. The adhesive 14 is formed on surfaces of one of the pads on IC chip 17 and on the terminal pads 12c or on both pads by screen printing or transfer printing, and serves to join the IC chip 17 and film 12b with each other. If the leads 13b are gold, the adhesive 14 is directly secured to the leads 13b, since the leads 13b have high conductivity. However, if the film 12b is made of material having high conductivity, leads 13b can be omitted. The IC chip 17 has functions which include a function of driving the display panel, computing, time measuring, A/D converting, or various measurements.

Leads 16a on a lead substrate 16 for electrically connecting the IC chip 17 to outside circuits (not shown) are connected to the conductive input film 12d on the connecting portion 11c of substrate 11b through conductive connecting pads 15.

A nonconducting coating 18 of molding material is formed on the substrate 11b so as to prevent IC chip 17 and films and leads from corrosion, to prevent leakage between the leads and to ensure the adhesion effect of adhesive 14. The nonconducting molding material is made of epoxy resin or silicone resin and the coating 18 is formed by dropping or painting the material. When forming the coating 18, it is necessary to pay attention so as not to produce bubbles in the coating.

If necessary, a light absorbent agent, such as a pigment for shielding light, may be added in the molding material.

Figure 3:
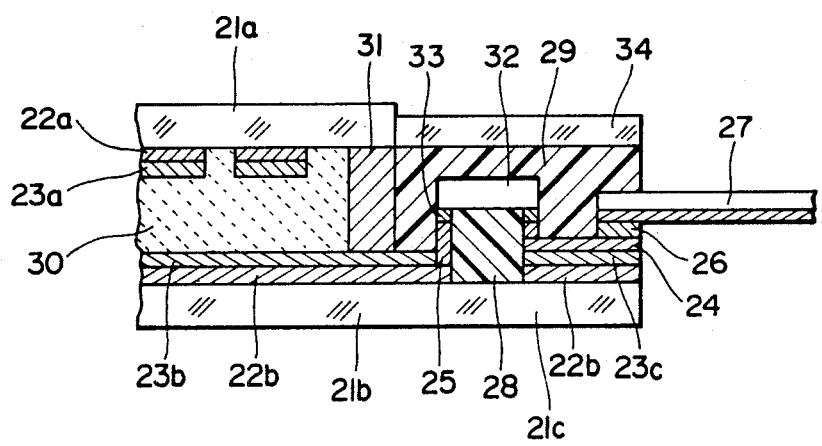
FIG. 3 is a sectional view partly showing another embodiment of the present invention.

Referring to FIG. 3 showing another embodiment of the present invention, a display panel comprises transparent upper and lower substrates 21a and 21b, and transparent conductive films 22a and 22b mounted on inner surfaces of the substrates. Leads 23a and 23b disposed on films 22a, and 22b, are made of nickel phosphate film by electroless plating, or nickel or chromium by thin film. Liquid crystal material 30 is sealed by sealing members 31 between upper and lower substrates 21a and 21b.

Leads 24 made of gold, or nickel are coated on leads 23c disposed on the substrate 21b at an input connecting portion 21c by electroplating to reduce resistance at input portions.

A lead plate 27 for electrically connecting the liquid crystal display panel to outside circuits is connected to the leads 24 through conductive connecting pads 26.

An IC chip 32 is provided with a plurality of bumps 33 which are connected to conductive films 22b and leads 24 through conductive adhesive 25. Each bump 33 is made of gold or solder plated by gold. The conductive adhesive 25 is adapted to connect to conductive films 22b and leads 24. The conductive adhesive 25 is made of epoxy paste, which is filled with powder of gold, silver, palladium, or nickel, and disposed on necessary portions by transfer printing method for example, by an intaglio offset press.

Molding material coating 28 is provided in a space betweem the IC chip 32 and substrate 21b by injection and another molding material coating 29 is deposited on the substrate 21b including the IC chip. The material of coating or layer 28 is preferably epoxy or silicone resin having characteristics of high adhesiveness, elasticity and low viscosity comparing with the resin of coating 29, in consideration of temperature characteristic. The bumps 33 serve to form a large space between the IC chip 32 and substrate 21b, so that the molding material can be easily injected into the space without bubbles forming and leakages between leads 23b and between films 22b can be prevented.

A thin glass plate 34 is provided on the molding material coating 29 for effectively preventing the deformation of the molding material layer.

The treatments for applying the conductive adhesive 25 and molding material depend on the heat resistance of the liquid crystal display panel. Experiment on the display characteristic of the display panel was conducted under conditions of 150° C. for one hour, 130° C. for three hours, and 110° C. for twenty-four hours. The result is that there is no change in orientation and bubble generation in the liquid crystal material, and in the panel gap.

In accordance with the present invention, a display device having the following advantages may be provided.

(1) By the conductive adhesives, the IC chip can be connected to leads of the liquid crystal display panel without deterioration thereof;

(2) The molding material coating prevents the corrosion of leads of liquid crystal display panel and the IC chip, and ensures insulating operation for leads and sealing effect; and (3) By the molding material coating, rigidity, heat resistance, and moisture resistance are improved.

While the invention has been described in conjunction with preferred specific embodiments thereof, it will be understood that this description is intended to illustrate and not limit the scope of the invention, which is defined by the following claims.

What is claimed is:

1. A liquid crystal display device comprising:
   a liquid crystal display panel having upper and lower substrates, conductive films provided on the underside of the upper substrate and on the lower substrate,
   a connecting portion formed on one of the substrates;
   terminal portions formed on the connecting portion and electrically connected to the conductive films on the substrate having the connecting portion;
   an IC chip having terminal portions on the underside thereof;
   conductive adhesives disposed between the terminal portions on the connecting portion and the terminal portions of the IC chip to join both terminal portions with each other; and
   a nonconducting coating provided on the connecting portion covering the IC chip.

2. The liquid crystal display device according to claim 1 further comprising leads provided on the conductive films.

3. The liquid crystal display device according to claim 1 wherein the nonconducting coating is provided to further cover conductive films on the connecting portion.

4. The liquid crystal display device according to claim 1 wherein the space between the IC chip and the lower substrate is filled with resin different from the outside coating in characteristic.

* * * * *